(12) United States Patent
Schmidt et al.

(10) Patent No.: US 12,066,249 B2
(45) Date of Patent: Aug. 20, 2024

(54) INDUCTION FURNACE AND METHOD FOR DENTAL REPLACEMENT PART HEAT TREATMENT

(71) Applicant: DENTSPLY SIRONA inc., York, PA (US)

(72) Inventors: Christian Schmidt, Bensheim (DE); Michael Baurer, Bretten (DE)

(73) Assignee: DENTSPLY SIRONA INC., York, PA (US)

( * ) Notice: Subject to any disclaimer, the term of this patent is extended or adjusted under 35 U.S.C. 154(b) by 365 days.

(21) Appl. No.: 16/078,074

(22) PCT Filed: Feb. 24, 2017

(86) PCT No.: PCT/EP2017/054289
§ 371 (c)(1),
(2) Date: Aug. 21, 2018

(87) PCT Pub. No.: WO2017/144644
PCT Pub. Date: Aug. 31, 2017

(65) Prior Publication Data
US 2019/0101332 A1    Apr. 4, 2019

(30) Foreign Application Priority Data
Feb. 24, 2016 (DE) .................. 10 2016 202 902.9

(51) Int. Cl.
*F27B 17/02* (2006.01)
*A61C 13/00* (2006.01)
(Continued)

(52) U.S. Cl.
CPC ............ *F27B 17/025* (2013.01); *A61C 13/00* (2013.01); *A61C 13/08* (2013.01); *A61C 13/20* (2013.01);
(Continued)

(58) Field of Classification Search
CPC ....... F27B 17/025; A61C 13/00; A61C 13/08; A61C 13/20; F27D 5/0043; F27D 9/00;
(Continued)

(56) References Cited

U.S. PATENT DOCUMENTS 4,301,320 A * 11/1981 Hochstrasser ............ F27D 9/00
165/104.31
5,022,044 A *  6/1991 Thomas ................ F27B 14/061
219/632

(Continued)

FOREIGN PATENT DOCUMENTS

DE    19923197 C2    9/2001
DE    10346465 A1    5/2005
(Continued)

OTHER PUBLICATIONS

Non-patent literature to Sandia National Laboratories, "Sandia researchers develop ultra-high-temperature ceramics to withstand 2,000 degrees Celsius" (Year: 2003).*

(Continued)

*Primary Examiner* — Helena Kosanovic
*Assistant Examiner* — Bonita Khlok
(74) *Attorney, Agent, or Firm* — DENTSPLY SIRONA INC.

(57) ABSTRACT

An induction furnace for carrying out a heat treatment of a dental replacement part. The induction furnace includes an induction coil, a radiant heater, an insulation layer and a furnace chamber. The induction furnace has a cooling system with a liquid cooling system in order to control an internal temperature of the furnace chamber.

17 Claims, 2 Drawing Sheets

(51) Int. Cl.
*A61C 13/08* (2006.01)
*A61C 13/20* (2006.01)
*F27D 5/00* (2006.01)
*F27D 9/00* (2006.01)
*F27D 19/00* (2006.01)
*F27D 21/00* (2006.01)

(52) U.S. Cl.
CPC .............. *F27D 5/0043* (2013.01); *F27D 9/00* (2013.01); *F27D 19/00* (2013.01); *F27D 21/00* (2013.01); *F27D 21/0014* (2013.01); *F27D 2019/0018* (2013.01)

(58) Field of Classification Search
CPC ...... F27D 19/00; F27D 21/00; F27D 21/0014; F27D 2019/0018
USPC ....... 219/390, 600, 667, 601, 618, 628–630, 219/632, 634, 635, 660–663, 672–677, 219/756–759; 432/205, 4, 120, 18, 13; 264/16; 266/250; 373/138, 149, 151, 373/140, 152–154
See application file for complete search history.

(56) References Cited

U.S. PATENT DOCUMENTS

| | | | | |
|---|---|---|---|---|
| 6,008,482 | A * | 12/1999 | Takahashi | B24B 49/105 219/687 |
| 6,447,852 | B1 * | 9/2002 | Gordeev | C04B 35/52 264/328.1 |
| 6,455,816 | B1 * | 9/2002 | Reddy | A47F 3/001 126/337 R |
| 2005/0252587 | A1 * | 11/2005 | Iijima | C21D 1/42 148/567 |
| 2006/0118546 | A1 * | 6/2006 | Saijo | H05B 3/141 219/542 |
| 2009/0266807 | A1 * | 10/2009 | Valliappan | F27D 21/00 219/391 |
| 2010/0047731 | A1 * | 2/2010 | Zubler | A61C 13/20 432/53 |
| 2010/0051609 | A1 * | 3/2010 | Fishman | C30B 11/003 219/634 |
| 2012/0118875 | A1 * | 5/2012 | Jussel | A61C 13/20 219/634 |
| 2012/0267830 | A1 * | 10/2012 | Maginnis | F27B 14/061 264/434 |
| 2013/0213955 | A1 | 8/2013 | Jussel | |
| 2015/0230293 | A1 * | 8/2015 | Steinlage | F27B 14/061 219/634 |
| 2015/0247672 | A1 | 9/2015 | Schmidt | |
| 2016/0317257 | A1 | 11/2016 | Fornoff | |
| 2017/0019956 | A1 * | 1/2017 | Chen | H05B 6/36 |
| 2017/0176103 | A1 * | 6/2017 | Fornoff | F27B 17/02 |
| 2017/0203377 | A1 * | 7/2017 | Yokoyama | H01L 21/67103 |

FOREIGN PATENT DOCUMENTS

| | | |
|---|---|---|
| DE | 102008013555 A1 | 10/2009 |
| DE | 102014202575 A1 | 8/2015 |

OTHER PUBLICATIONS

International Preliminary Report on Patentability Chapter II; PCT/EP/2017/054289; Apr. 2, 2018 (completed).

International Search Report; PCT/EP/2017-054289; Apr. 12, 2017 (completed); Apr. 21, 2017 (mailed).

Written Opinion of the International Searching Authority; PCT/EP2017-054289; Feb. 24, 2017 (filing date).

* cited by examiner

INDUCTION FURNACE AND METHOD FOR DENTAL REPLACEMENT PART HEAT TREATMENT

TECHNICAL FIELD

The invention relates to an induction furnace for carrying out a heat treatment of a dental replacement part, comprising an induction coil, a radiant heater, an insulation layer and a furnace chamber.

BACKGROUND OF THE INVENTION

A number of sintering furnaces for carrying out heat treatments of dental replacement parts are known from the state of the art.

DE 10 2012 213 279 A1 discloses a sintering furnace for dental replacement parts made of ceramic, wherein the sintering furnace comprises drive means which can be operated in a computer-controlled manner and enable a loading sequence. A number of temperature profiles are stored in a memory of the sintering furnace, wherein a matching temperature profile is selected as a function of the size of the dental replacement part. The temperature profiles differ with respect to the heating rate and the holding time.

DE 10 2006 032 655 A1 discloses a sintering furnace for dental replacement parts, wherein the sintering furnace comprises a closing plate for positioning the dental replacement part, wherein a measuring system for measuring the internal temperature is disposed within the combustion chamber. The positioning of the closing plate relative to the dental furnace is controlled by means of a computer system in a temperature-dependent manner.

DE 10 2013 226 497 A1 discloses a method for planning a heat treatment of a dental replacement part, wherein a specific temperature profile for the heat treatment is automatically determined as a function of geometric parameters and material parameters of the dental replacement part by means of a computer. The temperature profiles differ with respect to the heating rate during a heating phase, with respect to the holding temperature, with respect to the holding time and with respect to a cooling rate during a cooling phase.

DE 10 2008 013 555 A1 discloses a sintering furnace for producing dental replacement parts, wherein the sintering of the dental replacement parts takes place along a sintering path. The dental replacement parts are exposed to different temperatures when traveling along a sintering path. The sintering path is therefore divided into individual sintering path segments which can be set to different temperatures. The carriers with the dental replacement parts to be sintered are moved along the sintering path with the aid of a slide. Different temperatures can be set for each of the sintering path segments. Different temperature profiles can therefore be set for the sintering of different ceramics.

One disadvantage of said methods and sintering furnaces is that, due to the relatively high thermal mass of the combustion chamber, the cooling phase after sintering with the furnace door closed can take a very long time. As a result, the overall duration of the sintering process is extended.

Another disadvantage of conventional sintering furnaces is that, particularly during the cooling phase, the internal temperature of the furnace chamber cannot be controlled precisely enough.

The object of the present invention is therefore to provide a sintering furnace and a method which enables a rapid cooling phase with a controllable cooling rate.

SUMMARY OF THE INVENTION

The invention relates to an induction furnace for carrying out a heat treatment of a dental replacement part comprising an induction coil, a radiant heater, an insulation layer and a furnace chamber. The induction furnace comprises a cooling system with a liquid cooling system, wherein the cooling system cools the induction coil and thus the radiant heater disposed next to the induction coil, so that an internal temperature of the furnace chamber is controlled by means of the cooling system.

DE 10 2014 202 575 A1 discloses a sintering furnace for components in the dental field, comprising a furnace chamber and a heating device, wherein the heating device comprises a thermal radiator. The thermal radiator can be heated inductively, wherein an encircling coil heats the thermal radiator in the form of a crucible.

The induction furnace is designed such that dental replacement parts can be sintered from a variety of dental materials. The essential feature is that an internal temperature of 1600° c. can be achieved in the furnace chamber. A further prerequisite is that the volume of the furnace chamber is relatively small, so as to enable rapid heating and rapid cooling.

The material of the dental replacement parts can be an oxide ceramic, in particular zirconium oxide, such as zirconium dioxide, or aluminum oxide, and nonprecious metal alloys such as a CoCrMo alloy or other Co-based alloys. A dental replacement part made of translucent zirconium oxide may comprise a veneer. The dental replacement part can also be produced from a pre-colored translucent zirconium oxide, wherein light or dark colorants can be admixed. In dentistry, the color of the pre-colored blocks for producing the dental replacement parts is subdivided into several colors A1, A2, A3, A4, B2, B3, C2, C3, D3 (see VITA color classes). The colors of the VITA color key (Vita Lamin-Shade Guide) cited in DE10346465A1 are widely used. The colors A1, A2 and A3 are among the most often used light colorants. The other colors are darker and are used less often for producing dental replacement parts. These types of blanks are offered under the name "inCoris TZI C" or "CEREC Zirconia".

The dental replacement part to be produced can, for example, be a complete denture for an implant, a dental prosthesis, a framework structure, a full crown, a partial crown, a bridge consisting of several whole teeth or an inlay.

The heat treatment can be sintering, crystallization or glazing, or a combination of crystallization and glazing as well as a combination of sintering and glazing of a dental replacement part.

When sintering, dental replacement parts are fully sintered from oxide ceramics, such as zirconium oxide and aluminum dioxide, and nonprecious metal alloys, such as a CoCr alloy. Within a heating phase, the dental replacement part is heated to a holding temperature at a specific heating rate. This holding temperature, which can be as high as 1600° C., is then maintained for a set holding time, which may, for example, be between 5 minutes and 40 minutes. In a further step, a cooling phase is carried out with a specific cooling rate and with the door closed, wherein the cooling rate can be between 30° C./minute and 300° C./minute. The cooling phase with the door closed continues until a set opening temperature is reached, wherein the furnace door is opened when the opening temperature is reached and air from the outside can flow into the furnace chamber. For zirconium oxide with light colorants of classes A1, A2 or A3, for example, the opening temperature can be as high as 1300° C., and for zirconium oxide with darker colorants it can be as high as 1100° C. The opening temperature for zirconium oxides can also be set at 700° C., because the diffusion openness of the zirconium oxide decreases sharply at this temperature. At temperatures above 700° C., the diffusion openness of the zirconium oxide is so high that air molecules, such as oxygen, can react with the zirconium oxide. This reaction usually leads to a coloration of the dental replacement part that is lighter than intended.

Crystallization occurs in particular in the case of glass ceramics with the lithium disilicate material system.

All metallic and ceramic base materials can be veneered or glazed by further firing processes after sintering. Painting, which is fired in the same furnace process, can also be carried out along with the glaze as a so-called surface finish. Glass ceramics furthermore have the advantage that they can be crystallized, painted and glazed in the same firing process.

Alternating current flows through the induction coil, so that an alternating magnetic field is built up in the interior of the induction coil. As a result, the electrically conductive radiant heater, which is disposed within the induction coil and forms the inner wall of the furnace chamber, is heated. The internal temperature within the furnace chamber thus rises, and the dental replacement part positioned inside the furnace chamber is heated. The induction coil is provided with a liquid cooling system, wherein water can be used as the cooling liquid.

One advantage of this induction furnace in comparison to conventional sintering furnaces is that, by controlling the alternating magnetic field, the temperature of the radiant heater, and thus the internal temperature of the furnace chamber, can be controlled more precisely and above all more quickly at higher heating rates or higher cooling rates.

Another advantage of this induction furnace is that the induction coil, and thus the radiant heater disposed within the induction coil, can be cooled by using the liquid cooling system. The internal temperature within the furnace chamber can thus be controlled by means of the liquid cooling system, in particular during the cooling phase. In the cooling phase, the alternating current can be switched off completely and the liquid cooling system can run at high performance, so that a maximum cooling of the internal temperature of the furnace chamber can be achieved.

The induction coil can advantageously be operated with alternating current and the radiant heater can be heated by an alternating magnetic field of the induction coil.

The use of an induction coil increases the reaction time compared to sintering furnaces with heating wires.

This is because the radiant heater, which at the same time forms the inner wall of the furnace chamber, is directly heated by the magnetic alternating current.

The radiant heater can advantageously form the inner wall of the furnace chamber, wherein the dental replacement part to be treated is arranged within the furnace chamber.

As a result, the conductive radiant heater is heated directly by the alternating magnetic field, so that the internal temperature of the furnace chamber, and with it the dental replacement part, can be quickly heated to a desired temperature.

The radiant heater can advantageously be formed in the shape of a cylinder, wherein the diameter of the radiant heater is at most 90 mm and the height of the radiant heater is at most 50 mm.

Due to the relatively small volume of the furnace chamber, the thermal mass of the induction furnace is relatively low, so that the furnace chamber can be cooled very quickly compared to conventional sintering furnaces by using the liquid cooling system. The volume of the furnace chamber is, nonetheless, dimensioned such that even larger dental replacement parts, such as bridges consisting of several teeth, can be sintered.

The radiant heater can advantageously be produced from a conductive non-oxide ceramic or from molybdenum disilicide.

The radiant heater can be produced from a conductive non-oxide ceramic, such as silicon carbide, or from molybdenum disilicide. The advantage of silicon carbide is that, even though this material is electrically conductive, it has a melting temperature of 2730° C. As a result, therefore, the required internal temperatures can be achieved. Molybdenum disilicide is an intermetallic chemical compound of molybdenum from the group of silicides having a melting point between 1870 and 2030° C.

The cooling system can advantageously comprise a fan, a radiator and a pump, wherein the induction coil is formed from a hollow metal tube through which a cooling liquid flows, wherein the cooling liquid is moved in the cooling circuit by the pump, wherein the radiator is cooled by the active fan with cool air in order to cool the cooling liquid.

The induction coil can be produced from a hollow metal tube of a copper alloy, for example. In the cooling phase, the cooling system can thus be operated at high performance when the alternating current is switched off. The active fan blows the cool air toward the radiator, which in turn cools a cooling liquid, e.g., water. The cooling liquid is then moved in the cooling circuit by means of the pump and cools the induction coil.

The induction furnace can advantageously comprise a cooling control of the cooling system, wherein a temperature sensor which acquires an internal temperature of the furnace chamber is disposed within the furnace chamber, wherein the cooling control controls the fan and the pump in such a way that a temperature of the induction coil, and thus the internal temperature within the furnace chamber, is controlled.

The temperature sensor can be a thermocouple, for example, that is designed for high temperatures up to 1700° C. or higher. The temperature sensor is disposed on an upper inner wall of the furnace chamber, for example. The cooling control can thus be carried out with the aid of a computer, wherein the internal temperature is acquired by means of the temperature sensor and the fan and the pump are controlled for cooling and a specific alternating current is applied to the induction coil for heating. The desired internal temperature within the furnace chamber can thus be achieved at any time, fully automatically, with the aid of the cooling control.

The insulation layer can advantageously be disposed between the radiant heater and the induction coil, wherein the insulation layer has a thickness of at most 5 mm.

The insulation layer prevents heat loss when the furnace chamber is heated. The insulation layer is, however, configured to be so thin and is disposed in such a way that the radiant heater is cooled as well when induction coil cools. The insulation layer also prevents the induction coil, which consists of a copper alloy, from being damaged by excessively high heat of the radiant heater.

The induction furnace can advantageously comprise a furnace door, wherein the furnace door has a support surface, upon which the dental replacement part to be treated is positioned, wherein the support surface forms a lower inner surface of the furnace chamber when the furnace door is closed.

The furnace door can therefore have an upper door stone with the support surface, upon which the dental replacement part is positioned. The sintering furnace can furthermore comprise drive means which allow an adjustment of the furnace door relative to the radiant heater. The induction furnace can thus be controlled by means of a computer to open and close the furnace door. Prior to sintering, therefore, in the first step, the dental replacement part is positioned on the support surface. In the second step, the furnace door is closed, in that the upper door stone moves into the furnace chamber in a computer-assisted manner using the drive means. After the sintering process, in the next step, the furnace door is opened by moving the upper door stone with the support surface out of the furnace chamber. The furnace chamber can have the shape of a cylinder, for example, wherein the lateral surface of the furnace chamber is formed by the radiant heater, wherein the upper surface of the furnace chamber is covered by an insulation layer, wherein the lower inner surface of the furnace chamber is substantially formed by the support surface of the furnace door. There is also an insulation layer disposed between the radiant heater and the induction coil.

The invention further relates to a method for carrying out a heat treatment using the induction furnace, wherein the cooling system cools the induction coil and with it the radiant heater disposed next to the induction coil, so that an internal temperature of the furnace chamber is controlled by means of the cooling system.

Said method makes it possible to carry out a heat treatment using the above-described induction furnace.

One advantage of this method is that the internal temperature of the furnace chamber can be precisely controlled using the cooling system. Compared to sintering furnaces with heating coils, the low thermal mass of the radiant heater makes a rapid cooling of the internal temperature possible.

Very quick sintering processes are made possible by such heating rates and cooling rates. In contrast, in conventional sintering furnaces with helical or U-shaped resistance heating elements, a cooling rate of less than 20° C. per minute is achieved when the furnace door is closed. The cooling phase from 1600° C. to 800° C. can therefore take up to 50 minutes. In the present method with the present induction furnace, such a cooling phase takes between 4 minutes and 15 minutes. In particular for dental replacement parts having a large volume, an excessively high heating rate or cooling rate can lead to thermal stresses, and thus to cracks in the dental replacement part. For this reason, it is essential to precisely control the heating rate or cooling rate with the use of the cooling system.

Another advantage of the present method is that the furnace door remains closed during the cooling phase, so that no fresh air from the outside can enter the furnace chamber.

This prevents cool air from the outside cooling the heated dental replacement part too quickly, which can lead to undesirable, for example green, discolorations. This is because zirconium oxide exhibits an increased diffusion openness at temperatures above 700° C., and thus an increased reactivity with oxygen molecules of the air.

The internal temperature of the furnace chamber can advantageously be controlled by means of a cooling control of the cooling system in such a way that, in a heating phase when the furnace door is closed, the internal temperature of the furnace chamber is increased at a set heating rate between 30° C./minute and 300° C./minute or, in a cooling phase when the furnace door is closed, the internal temperature of the furnace chamber decreases at a set cooling rate between 30° C./minute and 200° C./minute.

The heat treatment can advantageously be sintering, wherein the cooling rate of the cooling phase is set as a function of geometric parameters of the dental replacement part to be sintered, wherein the cooling rate for small dental replacement parts, such as a crown of a single tooth, is between 100 and 200° C./minute, wherein the cooling rate for larger dental replacement part, such as a multi-part bridge consisting of at least three teeth, is between 30 and 60° C./minute.

The geometric parameters of the dental replacement part to be sintered are, for example, a maximum lateral wall thickness, a maximum occlusal wall thickness, a ratio of the maximum occlusal wall thickness and the maximum lateral wall thickness, a maximum cross-section of the dental replacement part, a total volume of the dental replacement part, a maximum total length of the dental replacement part and/or a maximum cross-sectional change of the dental replacement part. These geometric parameters are known from the planning of the dental replacement part when using a CAD/CAM method or can be automatically determined by means of a computer.

The maximum lateral wall thickness refers to the lateral wall thickness of the dental replacement part, for example on the labial surfaces of incisors or the buccal surfaces of molars. The maximum occlusal wall thickness refers to the wall thickness of an occlusal surface of the dental replacement part. The maximum cross section of the dental replacement part refers to a cross section perpendicular to a tooth axis of the dental replacement part.

A suitable cooling rate, which does not cause any thermal stresses within the dental replacement part, is thus determined on the basis of the geometric parameters.

In a further computer-aided method, a virtual largest possible sphere is determined within the volume of the planned dental replacement part by means of a search algorithm. The diameter of such a largest possible sphere in the volume of the planned dental replacement part is then used as an additional geometric parameter for the selection or determination of a suitable temperature profile for the sintering process. For a diameter of the largest possible sphere of more than 4.5 mm, for example, the heating rate and the cooling rate for zirconium oxide may not exceed 80° C./minute. This is because a higher heating rate could result in thermal stresses, and thus cracks in the dental replacement part. For a diameter of the largest possible sphere of less than 3 mm, for example, the heating rate can be as high as 200° C./minute.

A suitable temperature profile can advantageously be automatically determined by means of a computer using the known geometric parameters of the dental replacement part and a desired color of the dental replacement part, or a suitable temperature profile can be selected from a wide range of temperature profiles from a database, wherein the temperature profile comprises a heating phase with a specific heating rate, a holding phase with a specific holding temperature, a first cooling phase with a specific cooling rate when the furnace door is closed and a second cooling phase when the furnace door is open, the beginning of which is determined by an opening temperature for the furnace door, wherein a suitable heating rate or cooling rate is derived using the known geometric parameters of the dental replacement part and the cooling control of the cooling system is controlled accordingly in order to achieve the desired heating rate or cooling rate.

A suitable temperature profile is thus determined or selected as a function of the known geometric parameters and the desired color of the dental replacement part. The height of the heating rate and the cooling rate is a function of the geometric parameters of the dental replacement part. The height of the opening temperature has an effect on the color of the dental replacement part. In the case of zirconium oxide, a too high opening temperature leads to the zirconium oxide reacting with the oxygen molecules of the air, thus creating a lighter color of the dental replacement part than planned.

The desired cooling rate is therefore achieved by using the cooling control. To cool the furnace chamber, the alternating current of the induction coil is switched off and the fan and the pump of the liquid cooling system are switched on. To heat the furnace chamber, the alternating current of the induction coil is switched on and the fan and the pump of the liquid cooling system are switched off or turned down.

The furnace door can advantageously be opened at a set opening temperature, wherein the opening temperature is set as a function of the desired color of the dental replacement part.

This ensures that, until the opening temperature is reached, the dental replacement part is cooled in a controlled manner at a set cooling rate to achieve a desired color of the dental replacement part. After the furnace door is opened, the dental replacement part is then cooled very rapidly by the inflow of cool air.

The dental replacement part can advantageously consist of a pre-colored zirconium oxide with colorants, wherein the furnace door is opened at a set opening temperature, wherein the opening temperature for a zirconium oxide with light colorants is at most 1300° C., wherein the opening temperature for a zirconium oxide with dark colorants is at most 1100° C.

The furnace door is therefore opened at a set opening temperature depending on the material used.

The furnace door can advantageously be opened automatically at the set opening temperature.

The furnace door is thus automatically opened by means of a computer, wherein the internal temperature is measured by means of the temperature sensor and, as soon as the set opening temperature is reached, the drive means are actuated to open the furnace door.

An acoustic or optical signal can advantageously be provided at the set opening temperature to indicate that the opening temperature has been reached.

The reaching of the opening temperature is thus indicated by means of an acoustic or optical display means. The user can then open the furnace door manually or by actuating the drive means of the furnace door.

The material being used can be entered by the user during the planning of the dental replacement part, so that an opening temperature suitable for the material being used is automatically set by the computer.

The opening temperature for zirconium oxide can also be at most 700° C. This is because, at temperatures below 700° C., the diffusion openness of the zirconium oxide is so low that air molecules, such as oxygen, can no longer react with the zirconium oxide. As a result, below 700° C., the dental replacement part made of zirconium oxide can be cooled much more quickly at a higher cooling rate without the occurrence of undesirable, for example green, discolorations.

The colored zirconium oxide used as a sintering material for dental replacement parts usually contains colorants made of iron oxide. The sintering material can additionally contain between 0.05 and 0.35 volume percent aluminum oxide as a sintering aid. In the event of a high diffusion openness of the lattice of the zirconium oxide, the iron oxide in the lattice of the zirconium oxide then reacts with the oxygen molecules of the air, so that undesirable discolorations of the iron oxide can occur. The volume fraction of iron oxide then determines the color of the sintering material.

The heat treatment of the dental replacement part can advantageously be sintering, crystallization, glazing, a combination of sintering and glazing or a combination of crystallization and glazing, wherein, in a heating phase when the furnace door is closed, the internal temperature of the furnace chamber is increased at a set heating rate.

As a result, during the heating phase and during the cooling phase, the desired internal temperature of a specific heat treatment can be varied.

BRIEF DESCRIPTION OF THE DRAWINGS

The invention is explained with reference to the drawings. The drawings show.

DETAILED DESCRIPTION OF THE INVENTION

Figure 1:
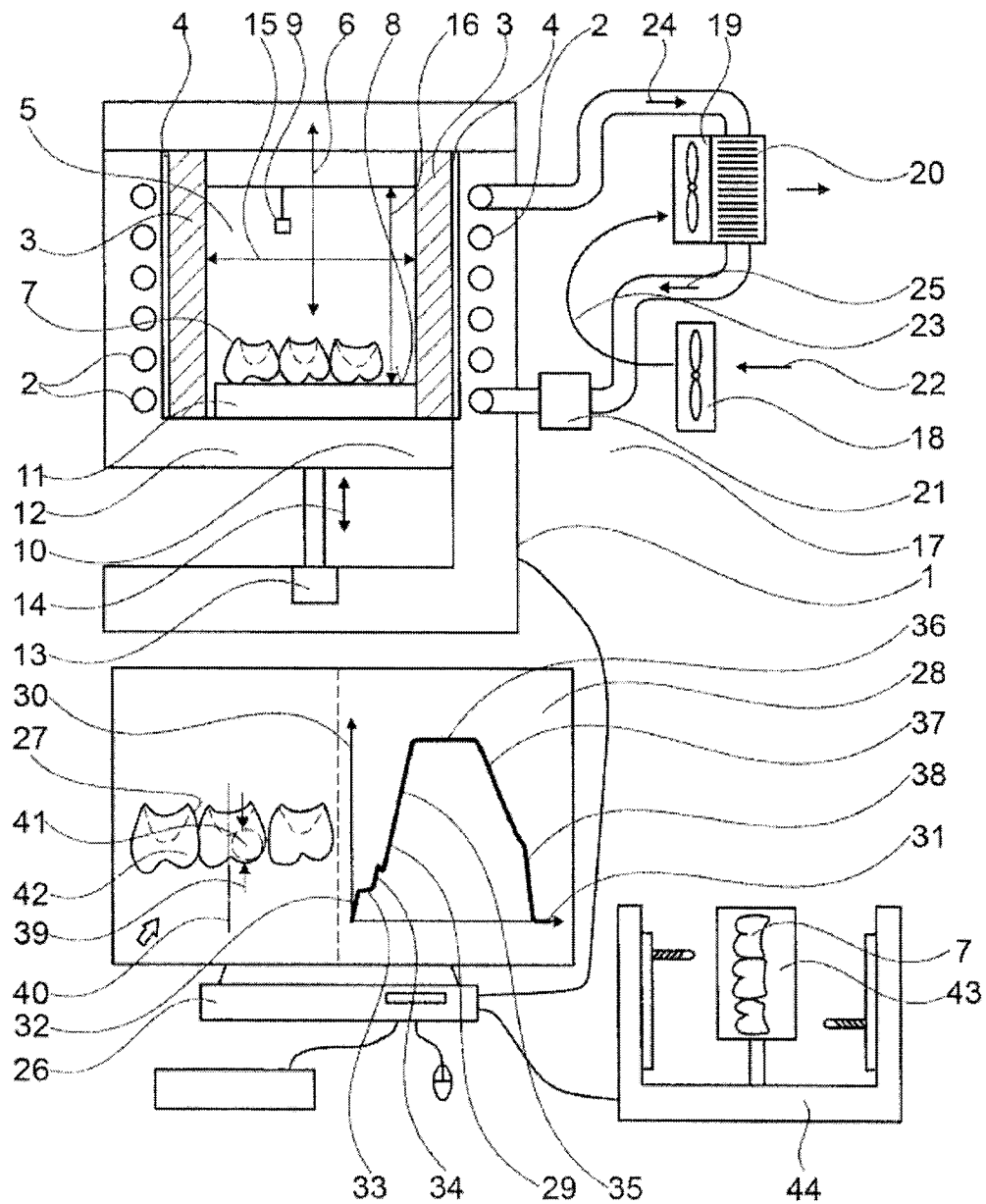
FIG. 1 a sketch to illustrate the present method.

FIG. 1 shows a sketch to illustrate the present method for carrying out a heat treatment using an induction furnace 1, wherein the induction furnace 1 comprises a water-cooled induction coil 2, a radiant heater 3, an insulation layer 4 and a furnace chamber 5. The induction coil 2 is produced from a hollow tube made of a copper alloy, wherein the induction coil 2 is arranged around the radiant heater 3. The induction coil 2 is operated with alternating current, so that an alternating magnetic field 6 is created inside the induction coil 2. As a result, the electrically conductive radiant heater 3, which can consist of a non-oxide ceramic or molybdenum disilicide, for example, is heated. The internal temperature within the furnace chamber therefore increases as well, and a dental replacement part 7, which in the present case is a bridge consisting of three teeth, is likewise heated. In doing so, the dental replacement part 7 is arranged within the furnace chamber 5 on a support surface 8. The internal temperature of the furnace chamber 5 is acquired by means of a temperature sensor 9. The support surface 8 is an upper surface of the furnace door 10, which consists of an upper door stone 11 and a lower door stone 12. Using a drive means 13, such as an electric motor, the furnace door can be closed or opened as indicated by the arrow 14. When the furnace door 10 is opened, the furnace door 10 is moved downward relative to the furnace chamber 5, so that fresh air can flow in from the outside and the dental replacement part 7 can be removed. When the furnace door 10 is closed, the furnace door 10 is moved upward by means of the drive means 13 until the lower door stone 12 comes into contact with the radiant heater 3, thus creating a closed volume of the furnace chamber 5.

The insulation layer 4 is disposed between the induction coil 2 and the radiant heater 3. The thickness of the insulation layer 4 is relatively small and is at most 5 mm.

This prevents the induction coil 2, which consists of a copper alloy, from being overheated. At the same time, however, the insulation layer 4 is so thin that the cooling of the induction coil 2 also cools the radiant heater 3, thus decreasing the internal temperature of the furnace chamber 5. The radiant heater 3 can be formed in the shape of a cylinder, wherein the inner diameter 15 of the radiant heater 3, which is also the diameter of the furnace chamber 5, can, for example, be at most 90 mm. A height 16 of the furnace chamber can be at most 50 mm, for example. The sintering furnace 1 has a cooling system 17 with a liquid cooling system, wherein the liquid cooling system comprises a first fan 18, a second fan 19, a radiator 20 and a water pump 21. In a cooling phase of the heat treatment, the cooling system 17 can thus be operated at high performance when the alternating current of the induction coil 2 is switched off. In the process, the active first fan 18 blows cool air 22 along an air flow 23, which likewise contributes to cooling the sintering furnace, toward the second fan 19. The second fan 19 blows the cool air through the radiator 20, which in turn cools a cooling liquid 24, such as water. The cooling liquid 24 is then moved in the cooling circuit 25, which is indicated by the arrows, by means of the water pump 21 and thus cools the induction coil 2.

The induction coil 2 is disposed in the vicinity of the radiant heater 3, so that the cooling of the induction coil 2 also cools the radiant heater 3, and thus also lowers the internal temperature of the furnace chamber 5. Therefore, when the alternating current is switched off, the induction coil 2 serves as a liquid cooling system for the furnace chamber 5.

The planning of the dental replacement part 7 is carried out with the aid of a computer 26, wherein a 3D model 27 of the dental replacement part 7 is generated, wherein the 3D model 27 is displayed by means of a display device 28. A temperature profile 29 for a sintering treatment is specified as a function of geometric parameters and the color of the planned dental replacement part 7. The temperature profile 29 is shown as a graph of a temperature as a function of the time 31. In a first phase 32, the furnace chamber 5 is heated to a pre-drying temperature 33.

In a second phase, the pre-drying temperature is maintained for a first holding time. In a third phase 34, the temperature in the furnace chamber 5 is increased to a loading temperature, for example 300° C. In a fourth phase, the furnace chamber 5 is loaded with the dental replacement part 7 to be sintered, as a result of which the temperature falls slightly. In a fifth phase 35, the temperature in the furnace chamber 5 increases at a second heating rate to a second holding temperature 36. In a sixth phase, the induction coil 2 and the liquid cooling system 17, comprising the fans 18, 19 and the water pump 21, are controlled in such a way that the holding temperature 36 is maintained for a duration of a specified holding time. In the seventh phase, a cooling phase of the dental replacement part 7 takes place at a set cooling rate and with the furnace door 10 closed. In an eighth phase 38 below a specified opening temperature, the furnace door 10 is opened so that fresh air can flow into the furnace chamber 5 from the outside and the dental replacement part 7 cools more quickly. The dental replacement part is subsequently removed from the induction furnace 1 when the door 10 is open. The heating rate during the heating phase and the cooling rate during the cooling phase 37, in particular, are dependent on the geometric parameters of the planned 3D-model 27. A maximum occlusal wall thickness 39 parallel to a tooth axis 40 of the 3D model, for example, is determined. In a further method, a largest possible sphere 41 within the entire volume 42 of the 3D model 27 is determined. A diameter of this largest possible sphere 41 is an important geometric parameter for determining a suitable temperature profile 29. For a diameter of the largest possible sphere 41 of more than 4.5 mm, for example, the heating rate and the cooling rate for zirconium oxide may not exceed 80° C./minute. Prior to sintering, the dental replacement part 7 is fully automatically milled out of a blank 43 by means of a CAM processing machine 44. The blank 43 consists of a sintering material that is suitable with respect to the color. A shrinking effect during sintering is taken into account when planning the 3D model 27. The milled dental replacement part 7 is subsequently sintered with the aid of the induction furnace 1, wherein the induction furnace 1, in particular the induction coil 2 and the cooling system 17, is controlled by means of the computer 26 in such a way that the internal temperature of the furnace chamber 5 is changed according to the planned temperature profile 29 as a function of the time. This ensures that undesirable discolorations or cracks caused by thermal stresses during the sintering of the dental replacement part are prevented.

Figure 2:
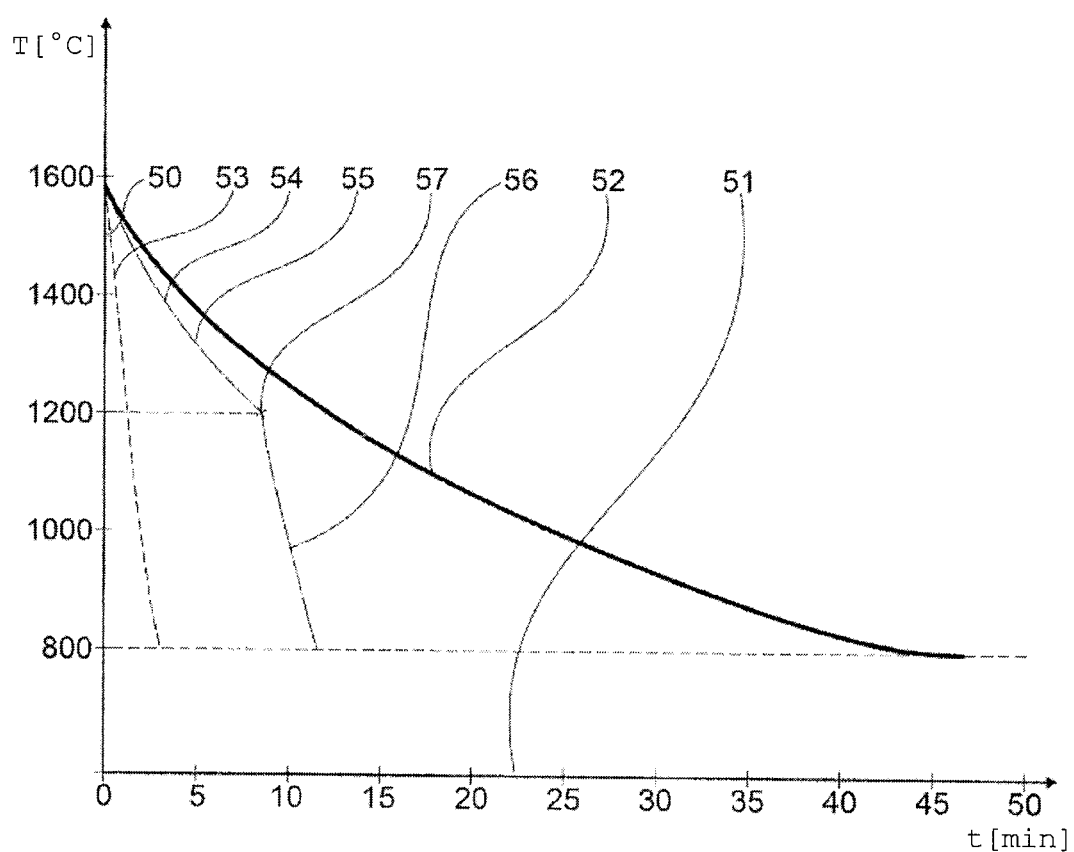
FIG. 2 a number of cooling phases of temperature profiles.

FIG. 2 shows several cooling phases of temperature profiles, wherein the temperature 50 is plotted as a function of another time 51. A first cooling phase 52 refers to a conventional sintering furnace for dental replacement parts, which is operated with helical or U-shaped resistance heating elements. Therefore, when the furnace door is closed, the cooling phase of such a conventional sintering furnace from a sintering temperature of 1600° C. to 800° C. lasts more than 45 minutes. This results in a cooling rate of less than 20° C./minute.

In comparison, a second cooling phase 53 with the furnace door closed, which is indicated by a dashed line, only takes about 4 minutes, wherein the cooling rate is approximately 200° C./minute. This second cooling phase 53 is in particular suitable for very small dental replacement parts, such as thin inlays.

A third cooling phase 54 is indicated by a dashed-dotted line, and comprises a cooling phase 55 with the furnace door 10 of the induction furnace 1 of FIG. 1 closed and a cooling phase 56 with the furnace door 10 open. At a set opening temperature 57, the furnace door 10 of the sintering furnace 1 is thus opened automatically by means of the drive means 13 from FIG. 1. In the present case, the opening temperature 57 is 1200° C. This opening temperature is particularly suitable for zirconium oxide with light colorants, i.e. the color classes A1, A2 or A3. To prevent undesirable discolorations, a lower opening temperature of about 1000° C. is more suitable for zirconium oxide with dark colorants. The cooling phase 55 with the furnace door 10 closed has a cooling rate of approximately 30° C. per minute. The cooling phase 56 with the furnace door 10 open has a higher cooling rate of approximately 200° C. per minute to 300° C. The third cooling phase 54 is more suitable for larger dental replacement parts, such as three-part bridges. This is because the lower cooling rate prevents undesirable thermal stresses and resulting cracks within the dental replacement part 7.

In comparison to the cooling phase 52 of a conventional sintering furnace, it can clearly be seen that the duration of the cooling phase 53 for small dental replacement parts is reduced to 4 minutes and the duration of the cooling phase 54 for larger dental replacement parts is reduced to 12 minutes. The use of the induction furnace 1 therefore also reduces the entire duration of the sintering process.

REFERENCE SIGNS 1 induction furnace, sintering furnace
2 induction coil 3 radiant heater
4 insulation layer
5 furnace chamber
6 alternating field
7 tooth replacement part
8 support surface
9 temperature sensor
10 furnace door
11 upper door stone
12 lower door stone
13 drive means
14 arrow
15 inner diameter
16 height
17 cooling system, liquid cooling system
18 first fan
19 second fan
20 radiator
21 water pump
22 cool air
23 air flow
24 cooling liquid
25 cooling circuit
26 computer
27 3D model
28 display device
29 temperature profile
30 temperature
31 time
32 first phase
33 pre-drying temperature
34 third phase
35 fifth phase
35 heating phase
36 holding temperature
37 cooling phase
38 eighth phase
39 maximum occlusal wall thickness
40 tooth axis
41 largest possible sphere
42 volume
43 blank
44 CAM processing machine
50 temperature
51 another time
52 first cooling phase
53 second cooling phase
54 third cooling phase
55 cooling phase with closed furnace door
56 cooling phase with open furnace door
57 opening temperature

The invention claimed is:

1. An induction furnace for carrying out a heat treatment of a dental replacement part, comprising;
an induction coil that is formed of a hollow metal tube through which a cooling liquid flows;
a radiant heater;
a thermal insulation layer;
a furnace chamber;
a furnace door, and
a cooling system adapted to be controlled by a computer, said cooling system having a pump, the cooling liquid that is moved in a cooling circuit by the pump, a fan, and a radiator that is cooled with cool air by the fan to cool the cooling liquid, wherein the cooling system is configured, by the computer, to cool the induction coil, and thus the radiant heater disposed adjacent to the induction coil,
wherein the induction coil is operated with alternating current and the radiant heater is heated by an alternating magnetic field of the induction coil,
wherein the thermal insulation layer is disposed between the radiant heater and the induction coil, wherein the thermal insulation layer is configured to have a thickness that both prevents the induction coil from being overheated and allows cooling of the radiant heater through cooling of the induction coil, thus decreasing an internal temperature of the furnace chamber,
wherein the radiant heater is made of a conductive non-oxide ceramic or molybdenum disilicide,
wherein the cooling liquid is moved in the cooling circuit by the pump,
wherein the induction furnace comprises a cooling control of the cooling system,
wherein a temperature sensor is disposed within the furnace chamber, which acquires an internal temperature of the furnace chamber, and
wherein the cooling control controls the fan and the pump, to regulate a temperature of the induction coil and thus the internal temperature within the furnace chamber.

2. The induction furnace according to claim 1, wherein the radiant heater forms an inner wall of the furnace chamber, wherein the dental replacement part to be treated is arranged within the furnace chamber.

3. The induction furnace according to claim 1, wherein the radiant heater is formed in the shape of a cylinder, wherein the diameter of the radiant heater is at most 90 mm and the height of the radiant heater is at most 50 mm.

4. The induction furnace according to claim 1, wherein the furnace door comprises a support surface upon which the dental replacement part to be treated is positioned, wherein the support surface forms a lower inner surface of the furnace chamber when the furnace door is closed.

5. A method for carrying out a heat treatment using the induction furnace according to claim 1, wherein the cooling system cools the induction coil and thus the radiant heater disposed next to the induction coil, so that an internal temperature of the furnace chamber is controlled by the cooling system.

6. The method according to claim 5, wherein the internal temperature of the furnace chamber is controlled by the cooling control component of the cooling system in such a way that, in a heating phase when the furnace door is closed, the internal temperature of the furnace chamber is increased at a set heating rate between 30° C./minute and 300° C./minute or, in a cooling phase when the furnace door is closed, the internal temperature of the furnace chamber decreases at a set cooling rate between 30° C./minute and 200° C./minute.

7. The method according to claim 6, wherein the heat treatment is sintering, wherein the cooling rate of the cooling phase is set as a function of known geometric parameters of the dental replacement part to be sintered, wherein the cooling rate for small dental replacement parts is between 100 and 200° C./minute, wherein the cooling rate for larger dental replacement parts is between 30 and 60° C./minute.

8. The method according to claim 7, wherein a first temperature profile is automatically determined based on the known geometric parameters of the dental replacement part and a desired color of the dental replacement part, or the first temperature profile is selected from a range of temperature profiles from a database, wherein the first temperature profile has a heating phase with a specific heating rate, a holding phase with a specific holding temperature, a first cooling phase with a specific cooling rate when the furnace door is closed and a second cooling phase when the furnace door is open, the beginning of which is determined by an opening temperature for the furnace door, wherein a first heating rate or cooling rate is derived using the known geometric parameters of the dental replacement part and the cooling control component of the cooling system is controlled accordingly in order to achieve the first heating rate or cooling rate.

9. The method according to claim 5, wherein the furnace door is opened at a set opening temperature, wherein the opening temperature is set as a function of the desired color of the dental replacement part.

10. The method according to claim 9, wherein the dental replacement part includes a pre-colored zirconium oxide with colorants, wherein the opening temperature for a zirconium oxide with light colorants is at most 1300° C., wherein the opening temperature for a zirconium oxide with dark colorants is at most 1100° C.

11. The method according to claim 10, wherein the opening temperature is at most 700° C.

12. The method according to claim 9, wherein the furnace door is automatically opened at the set opening temperature.

13. The method according to claim 9, wherein, at the set opening temperature, an acoustic or visual signal is generated to indicate that the opening temperature has been reached.

14. The method according to claim 5, wherein the heat treatment of the dental replacement part is sintering, crystallization, glazing, a combination of sintering and glazing or a combination of crystallization and glazing, wherein, in a heating phase when the furnace door is closed, the internal temperature of the furnace chamber is increased at a set heating rate, wherein, in a cooling phase when the furnace door is closed, the internal temperature of the furnace chamber is decreased at a set cooling rate.

15. The induction furnace according to claim 1, further comprising:

a computer system wherein the computer system is configured to automatically open the furnace door at a defined opening temperature.

16. The induction furnace according to claim 1, further comprising:

an acoustic device;

wherein the acoustic device is configured with an acoustic signal that is generated at the defined opening temperature to indicate that said set opening temperature is reached.

17. The induction furnace according to claim 1, wherein the furnace chamber is configured to withstand an internal temperature of 1600° C.

* * * * *

UNITED STATES PATENT AND TRADEMARK OFFICE
CERTIFICATE OF CORRECTION

PATENT NO. : 12,066,249 B2  
APPLICATION NO. : 16/078074  
DATED : August 20, 2024  
INVENTOR(S) : Schmidt et al.

Page 1 of 1

It is certified that error appears in the above-identified patent and that said Letters Patent is hereby corrected as shown below:

In the Claims

In Column 11, Line 56, in Claim 1, delete "comprising;" and insert --comprising:-- therefor In Column 14, Lines 10-13, in Claim 15, delete "further comprising:
a computer system
wherein the computer system" and insert --wherein the computer-- therefor In Column 14, Line 19, in Claim 16, delete "an acoustic device;" and insert --a display;-- therefor In Column 14, Line 20, in Claim 16, delete "acoustic device" and insert --display-- therefor In Column 14, Line 20, in Claim 16, delete "acoustic" and insert --optical-- therefor In Column 14, Line 21, in Claim 16, delete "the" and insert --a-- therefor In Column 14, Line 22, in Claim 16, after "indicate", delete "that"

In Column 14, Line 22, in Claim 16, delete "set" and insert --defined-- therefor Signed and Sealed this  
First Day of July, 2025

Coke Morgan Stewart  
*Acting Director of the United States Patent and Trademark Office*